Patented June 21, 1927.

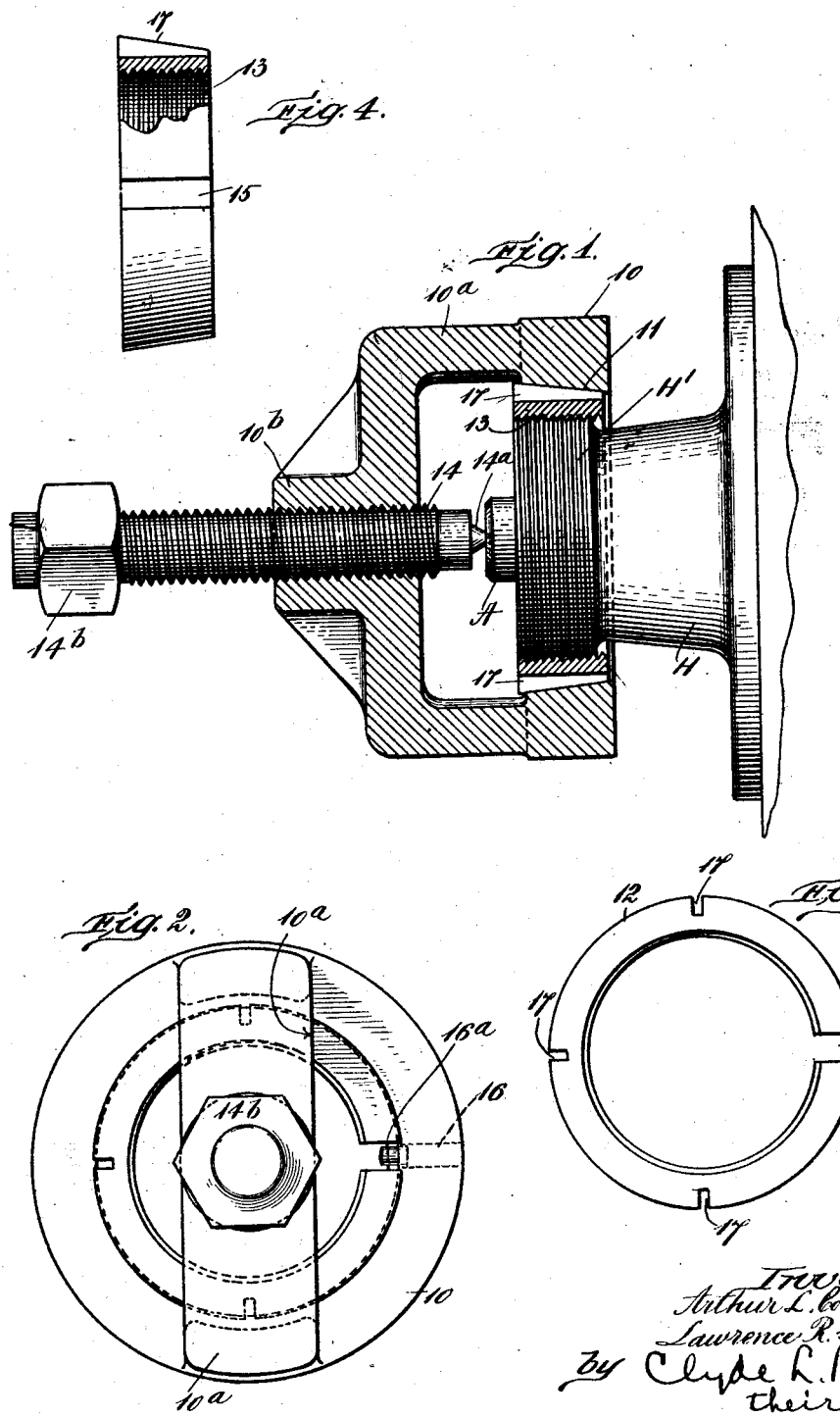

1,633,314

UNITED STATES PATENT OFFICE.

ARTHUR L. CORNWELL AND LAWRENCE R. GRAMES, OF WELLSVILLE, NEW YORK.

WHEEL PULLER.

Application filed August 28, 1923. Serial No. 659,744.

This invention relates to devices for drawing wheels from axles and while having other and more general fields of usefulness is particularly adapted and designed for use in removing wheels of automobiles in garages and service stations where a considerable range of sizes of wheel hubs are encountered. A principal object of the invention is to provide a simple, strong and efficient device for this purpose that is adapted to be fitted to any size of wheel hub within the usual range of sizes, and requiring for adaptability to any particular size or character of wheel hub or thread thereon, only the selection of a proper adapter ring, adapted to be assembled instantly with the body of the device in readiness for use, the complete equipment including an adequate range of such adapter rings for interchangeable use in the device. The foregoing and other objects and advantages of the invention will more fully appear from the following detailed description taken in connection with the accompanying drawings, and the distinctive features of novelty will be pointed out in the appended claims.

Referring to the drawings:

Fig. 1 is a central longitudinal section of a wheel puller embodying the invention, a portion of the wheel hub and axle being shown in elevation;

Fig. 2 is an end view looking from the left in Figure 1;

Fig. 3 is an end view of an adapter ring constituting an element of the device; and Fig. 4 is a side view of such adapter ring with a portion thereof broken away in section.

10 indicates the body of the device which is in the form of a relatively heavy and substantial ring having a conical opening 11 therethrough in which is fitted selectively one of a series of adapter rings 12. All of these adapter rings present a conical outer surface of the same dimension and adapted to fit into the conical opening 11 in the ring 10, while these rings internally are of varying dimension, and threaded as indicated at 13, so as to fit the different sizes and types of threaded end portions H' of wheel hubs H within the range of sizes and types ordinarily encountered and for which the device is intended. The body 10 has a stirrup portion 10ª extending outward therefrom and bearing a collar 10ᵇ which has an axial bore threaded to receive a stout and relatively heavy screw 14. The side portions of the stirrup 10ª extend out far enough so that the collar 10ᵇ is spaced outward from the ring 10 sufficiently to permit the insertion of the adapter rings 12 from either side. The screw 14 may be provided with a conical point 14ª adapted to engage the end of the wheel axle A, and its outer end may be provided with a squared head 14ᵇ for engagement by a wrench or like operating tool. Each adapter ring 12 is cut entirely through at one point as indicated at 15 providing an opening into which extends an inner end 16ª of a pin 16, which is fixed radially in the ring 10 with its outer end preferably finished flush with the exterior of the ring. The purpose of this pin is to cause the adapter ring to turn with the body ring 10, and by having the inner end 16ª of this pin engage in the opening 15 of the adapter ring the transmission of such turning movement from the body ring 10 to the adapter ring tends to spread open the adapter ring causing it to fit more easily upon the threaded end H' of the wheel hub. The adapter rings 12 are also preferably slotted across the conical exterior thereof well inwardly toward the thread at intervals as indicated at 17 to cause the several portions thereof to contract more easily and uniformly, thus applying an even pressure upon the thread of the wheel hub, and avoiding any likelihood of injury thereto. In use, the proper adapter ring 12 having been selected to fit upon a given wheel hub, this adapter ring is inserted in the conical seat 11 of the body ring 10 and screwed upon the threaded portion H', the engagement of the pin end 16ª with one end portion of the adapter ring in the opening 15 facilitating this operation as described. Then the screw H is turned up to engage the end of the axle A and apply pressure for drawing the hub off of the axle. In this operation the conical seat 11 of the body 10 acts upon the conical exterior of the adapter ring causing it to contact and be pressed strongly upon the threaded hub portion H', thus avoiding any tendency to stripping or mutilation of the threads of the hub, and the contraction of the adapter ring upon the hub being facilitated and rendered more uniform and even by the slots 17. We are aware that the invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having described our invention, what we claim as new and desire to secure by Letters Patent is:

1. A wheel puller comprising a body having a ring portion and a stirrup portion with a conical opening extending entirely through said ring portion and enlarging outwardly thereof, a contractible adapter ring having a conical exterior fitting said opening with a capability of free adjustment throughout the endwise extent thereof, said ring having a slot therethrough and said body bearing a pin extending into said slot for the purpose stated, and means borne by the stirrup portion of said body for exerting pressure upon the end of the axle to draw off the wheel.

2. A wheel puller comprising a body having a ring portion with a conical opening extending entirely therethrough and enlarging outwardly thereof, an adapter ring having a conical exterior fitting said opening with a capability of free adjustment throughout the endwise extent thereof and formed interiorly to engage a wheel hub, said ring having a slot therethrough at one point, and other slots extending partly therethrough to promote flexibility thereof, said body bearing a pin extending into the first named slot for the purpose stated, and a screw threaded in a portion of said body in position to engage the end of the wheel axle to exert pressure thereon for withdrawing the wheel.

3. A wheel puller comprising a body having a ring portion with a conical opening extending entirely therethrough enlarging outwardly, and a stirrup portion extending outwardly from said ring portion, and a contractible adapter ring having a conical exterior adjustably fitting said conical opening with a capability of adjustment throughout the endwise extent thereof, and an interior threaded to engage a wheel hub, said adapter ring having a slot therethrough and other slots extending partly therethrough from the exterior to promote resiliency thereof, said body ring portion bearing a radial pin extending into the first named slot for the purpose stated, and a screw threaded in the stirrup portion of said body co-axial with the opening therein and adapted to engage the end of the wheel axle for drawing off the wheel.

In testimony whereof, we have signed our names to this specification.

ARTHUR L. CORNWELL.
LAWRENCE R. GRAMES.